(12) United States Patent
Shindo

(10) Patent No.: US 7,639,591 B2
(45) Date of Patent: Dec. 29, 2009

(54) PHOTODETECTOR AND OPTICAL PICKUP APPARATUS

(75) Inventor: Hiroyuki Shindo, Tokyo (JP)

(73) Assignees: Sanyo Electric Co., Ltd., Osaka (JP); Sanyo Optec Design Co., Ltd., Tokyo (JP)

( * ) Notice: Subject to any disclaimer, the term of this patent is extended or adjusted under 35 U.S.C. 154(b) by 539 days.

(21) Appl. No.: 11/617,624

(22) Filed: Dec. 28, 2006

(65) Prior Publication Data

US 2008/0158571 A1    Jul. 3, 2008

(51) Int. Cl.
G11B 7/00    (2006.01)
(52) U.S. Cl. .............. 369/118; 369/44.24; 369/120
(58) Field of Classification Search ............. 369/118, 369/120, 44.23, 44.24; 356/626
See application file for complete search history.

(56) References Cited

U.S. PATENT DOCUMENTS 4,533,251 A * 8/1985 French et al. ............... 356/626
5,883,872 A * 3/1999 Kino ...................... 369/112.24
6,108,283 A * 8/2000 Fujita et al. ............. 369/44.23
6,577,584 B1 * 6/2003 Milster et al. ............... 369/118

FOREIGN PATENT DOCUMENTS

JP    04-168631    6/1992

* cited by examiner

Primary Examiner—Thuy N Pardo
(74) Attorney, Agent, or Firm—SoCal IP Law Group LLP; Steven C. Sereboff; John E. Gunther

(57) ABSTRACT

A light detecting apparatus includes a first photodetector for receiving $0^{th}$ reflected light from a first information surface, a second photodetector proximate to the first photodetector for receiving the reflected light of a positive higher-order diffracted light from the first information surface, and a third photodetector proximate to the first photodetector for receiving the reflected light of a negative higher-order diffracted light from the first information surface. Light-receiving areas of the second and the third photodetectors include other-order light receiving areas that receive reflected light of the $0^{th}$ order light from a second information surface where the $0^{th}$ order light is not be focused, and wherein portions of the other-order light receiving areas of the second and the third photodetectors include light reception prohibited areas that prohibit the reception of the reflected light of the $0^{th}$ order light from the second information surface.

13 Claims, 12 Drawing Sheets

13(b)

13(a)

13(c)

FOUR-SPLIT LIGHT DETECTOR
FOR +1ST ORDER LIGHT

FOUR-SPLIT LIGHT DETECTOR
FOR 0TH ORDER LIGHT

FOUR-SPLIT LIGHT DETECTOR
FOR −1ST ORDER LIGHT

FOUR-SPLIT LIGHT DETECTOR
FOR +1ST ORDER LIGHT

FOUR-SPLIT LIGHT DETECTOR
FOR 0TH ORDER LIGHT

FOUR-SPLIT LIGHT DETECTOR
FOR −1ST ORDER LIGHT

PHOTODETECTOR AND OPTICAL PICKUP APPARATUS

BACKGROUND OF THE INVENTION

1. Field of the Invention

The present invention relates to a light detecting apparatus and an optical pickup apparatus.

2. Description of the Related Art

Currently, CD (Compact Disc), DVD (Digital Versatile Disc), etc., are widely used as an optical disc medium for recording/reproducing information. To record/reproduce information on/from the optical disc medium, a focal point of a laser beam condensed by an object lens must be accurately focused on an information surface of the optical disc medium. Therefore, the focusing control is performed for correcting an error when the focal point of the laser light does not focused on the information surface of the optical disc medium, and the tracking control is performed for correcting an error when a spot condensed on the information surface is misaligned from the center of the predetermined track.

For example, the focusing control using the differential astigmatic method is known. In the focusing control using the differential astigmatic method, first, for example, 0th order light and ±1st order light are generated by diffracting the laser beam with a diffraction grating, etc. The 0th order light and the ±1st order light are applied to the information surface of the optical disc medium. To the reflected light of the 0th order light and ±1st order light reflected by the information surface, astigmatism is added by a cylindrical lens, etc. The reflected light of the 0th order light and ±1st order light with the astigmatism added is received by three four-split photodetectors disposed on a light detecting apparatus. FIG. 7 depicts a light-receiving pattern when the four-split photodetectors receive the reflected light of the 0th order light and ±1st order light while the focal point of the 0th order light is focused on the information surface of the optical disc medium. FIG. 8 depicts a light-receiving pattern when the four-split photodetectors receive the reflected light of the 0th order light and 1st order light, which has a maximum length defined as diagonal lines of light-receiving areas A' to L', while the focal point of the 0th order light is not focused on the information surface of the optical disc medium. Dash lines shown in FIGS. 7 and 8 show the light-receiving patterns of the reflected light of the 0th order light; dot-and-dash lines show the light-receiving patterns of the reflected light of the ±1st order patterns of the reflected light of the −1st order light. As shown in FIG. 7, when the focal point of the 0th order light is focused on the information surface of the optical disc medium, the light-receiving pattern of the reflected light of the 0th order light has a circular shape and is evenly received by the light-receiving areas A' to D'. The light-receiving pattern of the reflected light of the −1st order light also has a circular shape and is evenly received by the light-receiving areas I' to L', and The light-receiving pattern of the reflected light of the −1st order light also has a circular shape and is evenly received by the light-receiving areas E' to H'.

However, when the focal point of the 0th order light is not focused on the information surface of the optical disc medium, the light-receiving patterns of the reflected light of the 0th order light and ±1st order light have elliptical shapes, the diagonal lines of light-receiving areas A' to D', E' to H', and I' to L' corresponding to the respective centers of the elliptical shapes, and are not received evenly by the light-receiving areas A' to L'. Based on the output from the light-receiving areas A' to L', a focus effort signal (hereinafter, FE signal) is generated by calculating {(output of light-receiving area A'+output of light-receiving area C')−(output of light-receiving area B'+output of light-receiving area D')}+k[{((output of light-receiving area I'+output of light-receiving area K')−(output of light-receiving area J'+output of light-receiving area L')}+{(output of light-receiving area E'+output of light-receiving area G')−(output of light-receiving area F'+output of light-receiving area H')}] (where k is the light intensity of the 0th order light/the light intensity of the ±1st order light). Based on the FE signal, the focusing control can be performed to focus the focal point of the 0th order light on the information surface of the optical disc medium.

Recently, a two-layer optical disc medium having two information surfaces is widely used as the optical disc medium. As shown in FIG. 9, the two-layer optical disc medium is configured by bonding a substrate with a first information surface L0 formed and a substrate with a second information surface L1 formed via an intermediate layer. The information surface L0 is configured by a translucent reflecting film, reflects partial amounts of the 0th order light and the ±1st order light, and transmits remaining amounts of the 0th order light and the ±1st order light. The information surface L1 is configured by a reflecting film, and reflects 0th order light and ±1st order light emitted from the information surface L0. The focusing control is also performed for the two-layer optical disc medium to focus the focal point of the 0th order light on the information surfaces L0 and L1 (Japanese Patent Application Laid-Open Publication No. 4-168631).

However, in the two-layer optical disc medium, for example, when the focal point of the 0th order light focused on the information surface L0 is focused on the information surface L1 (state of the 0th order light of FIG. 9), the reflected light of the 0th order light maybe applied to the light-receiving areas I' and G', which normally should receive the reflected light of the ±1st order light, as shown in FIG. 10. In such a case, the FE signal based on the output of the four-split photodetectors maybe affected. The impact on the FE signal will be described with reference to FIG. 11. A thin solid line of FIG. 11 shows a 0th order light FE signal [={(output of light-receiving area A'+output of light-receiving area C')−(output of light-receiving area B'+output of light-receiving area D')}] based on the output of the four-split photodetector receiving the reflected light of the 0th order light. A dash line shows ±1st order light FE signal [=k {(output of light-receiving area I'+output of light-receiving area K')−(output of light-receiving area J'+output of light-receiving area L') }] based on the output of the four-split photodetector receiving the reflected light of the +1st order light (or −1st order light). A heavy solid line shows the FE signal (=above equation) based on three four-split photodetectors. As shown in FIG. 11, an S-shape (with in a dot-and-dash line) not generated in the 0th order light FE signal is generated in the ±1st order light FE signal near the middle of the information surface L0 and the information surface L1. Since this S-shaped ±1st order light FE signal is generated, an S-shape is also generated in the FE signal. Especially, when the light intensity of the 0th order light is high as compared to the light intensity of the ±1st order light (i.e., the value of k is high), the outputs of the light-receiving areas I' and G' are amplified with a high gain and the S-shape is certainly generated. The generation of this S-shape may have an impact when the focal point of the 0th order light focused on the information surface L0 is focused on the information surface L1 (e.g., the 0th order light cannot accurately be focused on the information surface L1). When the focal point of the 0th order light focused on the information surface L1 is focused on the information surface L0, the reflected light of the 0th order light is applied to the light-receiving areas J' and H', which normally should receive the reflected light of the ±1st order light, and this may also have an impact when the focal point of the 0th order light focused on the information surface L1 is focused on the information surface L0.

In the two-layer optical disc medium, for example, when the focal point of the 0th order light is focused on the information surface L0, the reflected light of the 0th order light from the information surface L1 (hereinafter, stray light) may be applied to the light-receiving areas A' and L' as shown in FIG. 12. Therefore, this may have an impact on a signal process based on the reflected light of the 0th order light from the information surface L0 (e.g., deterioration of jitters) and an impact on the tracking control (e.g., offset of the signal based on the reflected light of the list order light in the case of using the differential push-pull method for the tracking control).

SUMMARY OF THE INVENTION

In order to achieve the above object, according to a first aspect of the present invention there is provided a light detecting apparatus using a differential astigmatic method to focus 0th order light on any information surfaces of a multilayer optical disc medium, the 0th order light being among 0th order light, positive higher-order diffracted light of 1st or higher order, and negative higher-order diffracted light of 1st or higher order, all of which are generated by diffracting a laser beam, the apparatus comprising: a first photodetector that includes a light-receiving area for receiving the reflected light of the 0th order light from an information surface where the 0th order light should be focused on; a second photodetector that is adjacent to the first photodetector leaving a predetermined space therebetween, the second photodetector including a light-receiving area for receiving the reflected light of the positive higher-order diffracted light from the information surface where the 0th order light should be focused on; and a third photodetector that is adjacent to the first photodetector leaving a predetermined space therebetween, the third photodetector including a light-receiving area for receiving the reflected light of the negative higher-order diffracted light from the information surface where the 0th order light should be focused on, wherein the light-receiving areas of the second and the third photodetectors include other-order light receiving areas that receive the reflected light of the 0th order light from an information surface where the 0th order light should not be focused on, when the focal point of the 0th order light is moved from one information surface to the other information surface, and wherein portions of the other-order light receiving areas of the second and the third photodetectors include light reception prohibited areas that prohibit the reception of the reflected light of the 0th order light from the information surface where the 0th order light should not be focused on.

To achieve the above object, according to a second aspect of the present invention there is provided a light detecting apparatus using a differential astigmatic method to focus 0th order light on any information surfaces of a multilayer optical disc medium, the 0th order light being among 0th order light, positive higher-order diffracted light of 1st or higher order, and negative higher-order diffracted light of 1st or higher order, all of which are generated by diffracting a laser beam, the apparatus comprising: a first photodetector that includes a light-receiving area for receiving the reflected light of the 0th order light from an information surface where the 0th order light should be focused on; a second photodetector that is adjacent to the first photodetector leaving a predetermined space therebetween, the second photodetector including a light-receiving area for receiving the reflected light of the positive higher-order diffracted light from the information surface where the 0th order light should be focused on; and a third photodetector that is adjacent to the first photodetector leaving a predetermined space therebetween, the third photodetector including a light-receiving area for receiving the reflected light of the negative higher-order diffracted light from the information surface where the 0th order light should be focused on, wherein the light-receiving areas of the first, the second, and the third photodetectors include stray light receiving areas that receive stray light, which is the reflected light of the 0th order light from the other information surface where the 0th order light should not be focused on, when the 0th order light is focused on one information surface, and wherein portions of the stray light receiving areas of the first, the second, and the third photodetectors include light reception prohibited areas that prohibit the reception of the stray light.

To achieve the above object, according to a third aspect of the present invention there is provided an optical pickup apparatus comprising the light detecting apparatus.

The present invention can provide a light detecting apparatus and an optical pickup apparatus that can reduce impacts on recording/reproducing operation due to reflected light from a multilayer optical disc medium at the time of recording/reproduction on/from the multilayer optical disc medium.

The features of the present invention will become apparent from the accompanying drawings and the content of the description.

BRIEF DESCRIPTION OF THE DRAWINGS

To understand the present invention and the advantages thereof more thoroughly, the following description should be referenced in conjunction with the accompanying drawings.

DETAILED DESCRIPTION OF THE INVENTION

From the contents of the description and the accompanying drawings, at least the following details will become apparent.

Embodiment

CONFIGURATION EXAMPLE OF OPTICAL PICKUP APPARATUS

Figure 2:
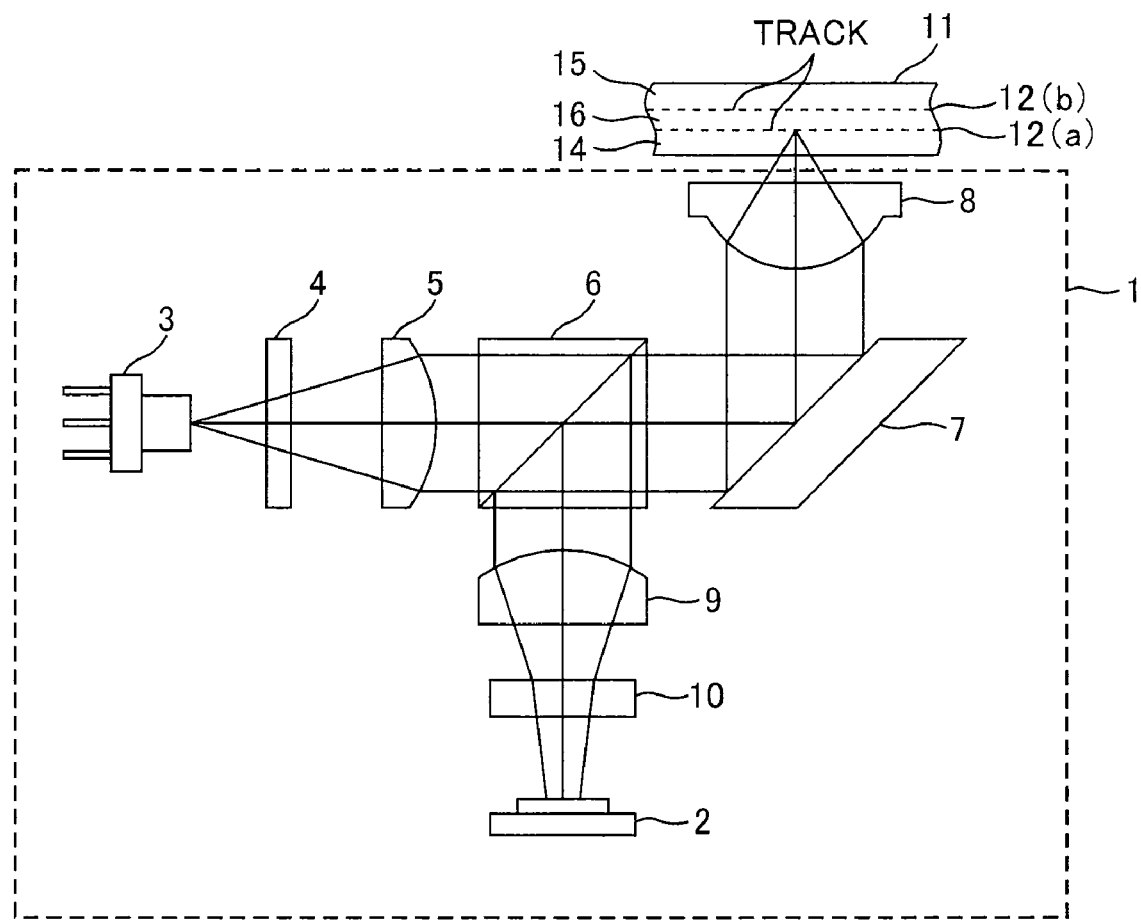
FIG. 2 is a functional block diagram of an example of an overall configuration of an optical pickup apparatus with the light detecting apparatus according to the present invention applied.

A configuration of an optical pickup apparatus 1 with a light detecting apparatus 2 according to the present invention applied will be described with reference to FIG. 2. FIG. 2 is a functional block diagram of an example of an overall configuration of the optical pickup apparatus 1 with the light detecting apparatus 2 according to the present invention applied. The optical pickup apparatus 1 shown in FIG. 2 shows a general optical pickup apparatus with the light detecting apparatus 2 according to the present invention applied, and the present invention is not limited to the optical pickup apparatus 1 including this configuration. The light detecting apparatus 2 according to the present invention can obviously be applied to any optical pickup apparatus as long as the differential astigmatic method is used for the focusing control.

The optical pickup apparatus 1 includes a semiconductor laser 3, a diffraction grating 4, a collimator lens 5, a beam splitter 6, a mirror 7, an objective lens 8, a condenser lens 9, a cylindrical lens 10, and an optical detecting apparatus 2.

The semiconductor laser 3 is configured by a diode formed by performing PN junction of P and N semiconductors, for example. With the application of a control voltage from a laser drive circuit not shown, the semiconductor laser 3 emits a laser beam with a wave length corresponding to the specification of an optical disc medium 11 (e.g., a blue-violet laser beam with a wavelength of 400 nm to 410 nm when the optical disc medium 11 is the Blu-ray Disc (registered trademark) ) to the diffraction grating 4.

The diffraction grating 4 diffracts the laser beam from the semiconductor laser 3 into, for example, the 0th order light and the ±1st order light (positive higher-order diffracted light of first or more order, negative higher-order diffracted light of first or more order), which are emitted to the collimator lens 5. In the following description, the diffraction grating 4 in the embodiment has a diffraction efficiency defined as a ratio of light amounts of the 0th order light and the ±1st order light, which is 15:1, for example.

The collimator lens 5 converts the 0th order light and the ±1st order light from the diffraction grating 4 into collimated light, which is emitted to the beam splitter 6.

The beam splitter 6 transmits and emits the 0th order light and the ±1st order light from the collimator lens 5 to the mirror 7. The beam splitter 6 also reflects the reflected light of the 0th order light and ±1st order light from information surfaces 12(a) and 12(b) of the optical disc medium 11 (hereinafter, the reflected light of the 0th order light is 0th order reflected light, the reflected light of the +1st order light is +1st order reflected light, and the reflected light of the −1st order light is −1st order reflected light), which is emitted from the mirror 7, and emits the reflected light to the condenser lens 9.

The mirror 7 reflects and emits the 0th order light and the ±1st order light from the beam splitter 6 to the objective lens 8. The mirror 7 also reflects and emits the 0th order reflected light and the 1st order reflected light from the objective lens 8 to the beam splitter 6.

The objective lens 8 has a numerical aperture corresponding to the specification of the optical disc medium 11 (e.g., numerical aperture of 0.85 of the Blu-ray Disc) due to an aperture limiting unit not shown. The objective lens 8 is incorporated in an actuator not shown that has a focusing drive coil, a tracking drive coil, etc., for performing the focusing control, the tracking control, etc., to the information surfaces 12(a) and 12(b) of the optical disc medium 11. The objective lens 8 condenses and emits the 0th order light and the ±1st order light to the optical disc medium 11 to focus the focal positions of the 0th order light and the ±1st order light limited by the aperture limiting unit on the information surfaces 12(a) and 12(b) of the optical disc medium 11. The objective lens 8 is moved in accordance with the movement of the actuator (hereinafter, focus jump) for focusing the focal points of the 0th order light and the ±1st order light from one information surface 12 onto the other information surface 12. The objective lens 8 converts the 0th order reflected light and the ±1st order reflected light from the information surfaces 12(a) and 12(b) of the optical disc medium 11 into collimated light, which is emitted to the mirror 7.

The condenser lens 9 condenses and emits the 0th order reflected light and the ±1st order reflected light from the beam splitter 6 to the cylindrical lens 10.

The cylindrical lens 10 is a hemicylindrical shape cylindrical lens and adds astigmatism to the 0th order reflected light and the ±1st order reflected light from condenser lens 9, which are emitted to the light detecting apparatus 2. Since the astigmatism is added to the 0th order reflected light and the 1st order reflected light, the light-receiving patterns of the 0th order reflected light and the 1st order reflected light in the light detecting apparatus 2 are changed from circular shapes to elliptical shapes as the focal position of the 0th order light is moved away from the information surfaces 12(a) and 12(b) in the thickness direction of the optical disc medium 11 as described later.

The optical disc medium 11 is a two-layer optical disc medium configured by bonding a substrate 14 with the information surface 12(a) formed and a substrate 15 with the information surface 12(b) formed via an intermediate layer 16. The information surface 12(a) is configured by a translucent reflecting film, reflects, for example, 30% of light amounts of the 0th order light and ±1st order light from the objective lens 8, and transmits the remaining 70%. The information surface 12(b) is configured by a reflecting film and reflects 70% of light amounts of the 0th order light and ±1st order light from the information surface 12(a).

==Configuration of Light Detecting Apparatus 2==

Figure 1:
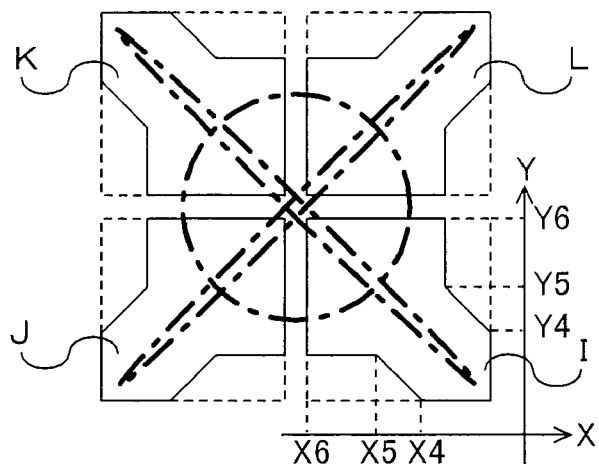
FIG. 1 depicts three four-split photodetectors configuring a light detecting apparatus according to the present invention.
Figure 1:
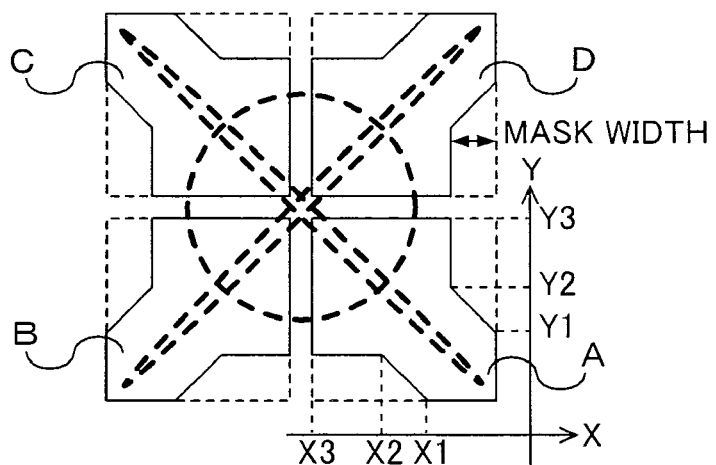
Figure 1:
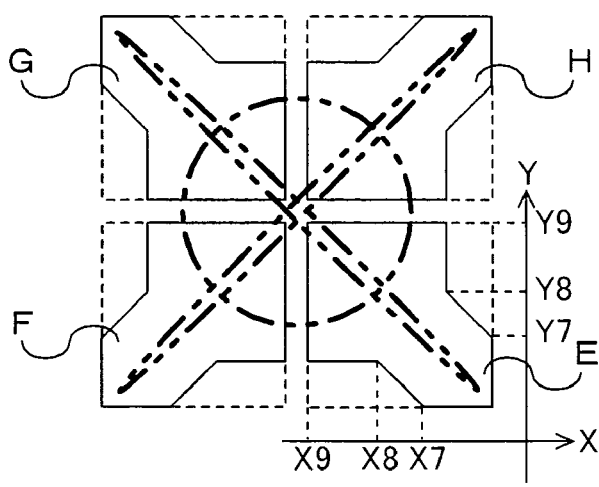
Figure 3:
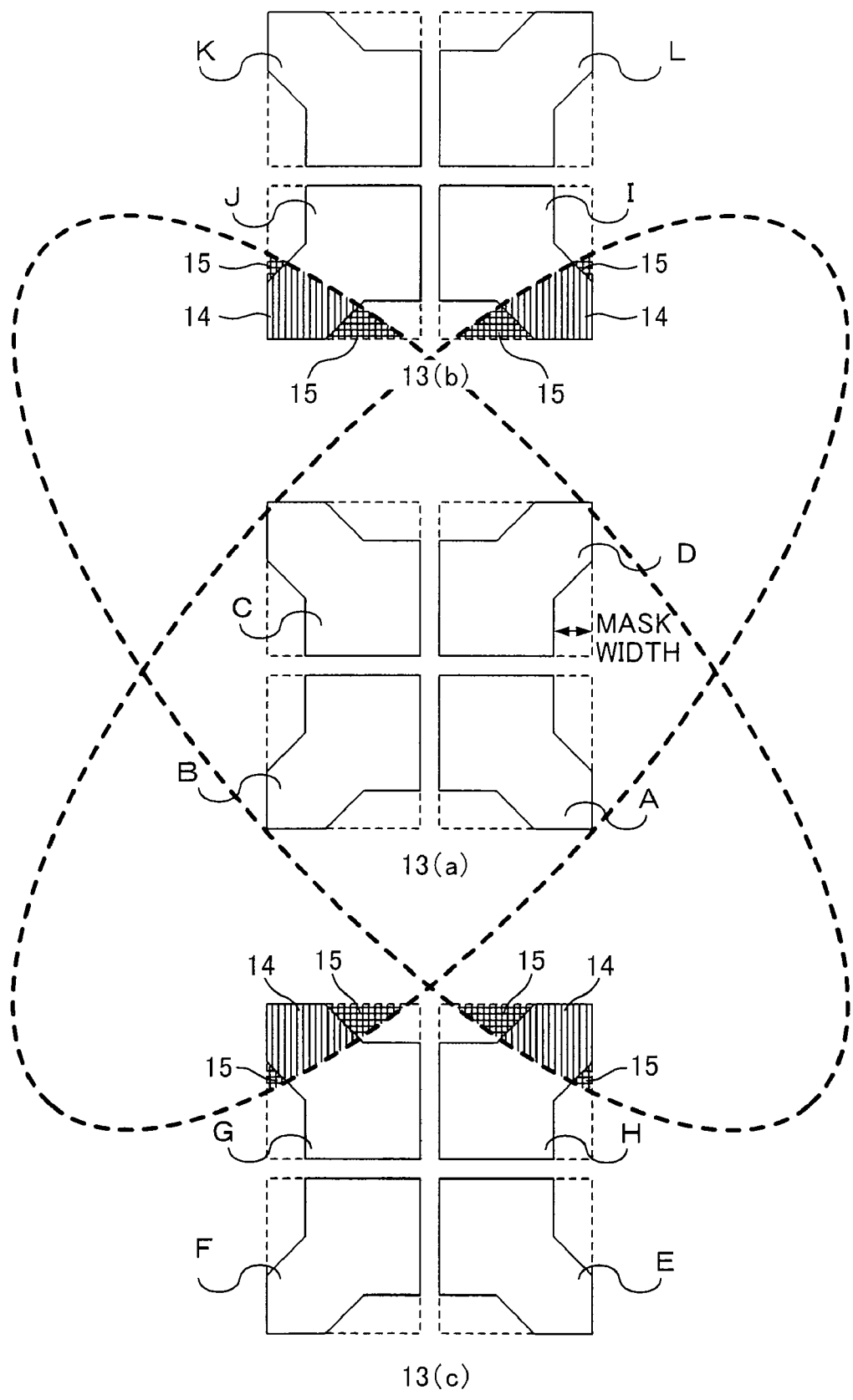
FIG. 3 depicts a light-receiving pattern of the 0th order reflected light from the other information surface at the time of focus jump from one information surface to the other information surface.
Figure 4:
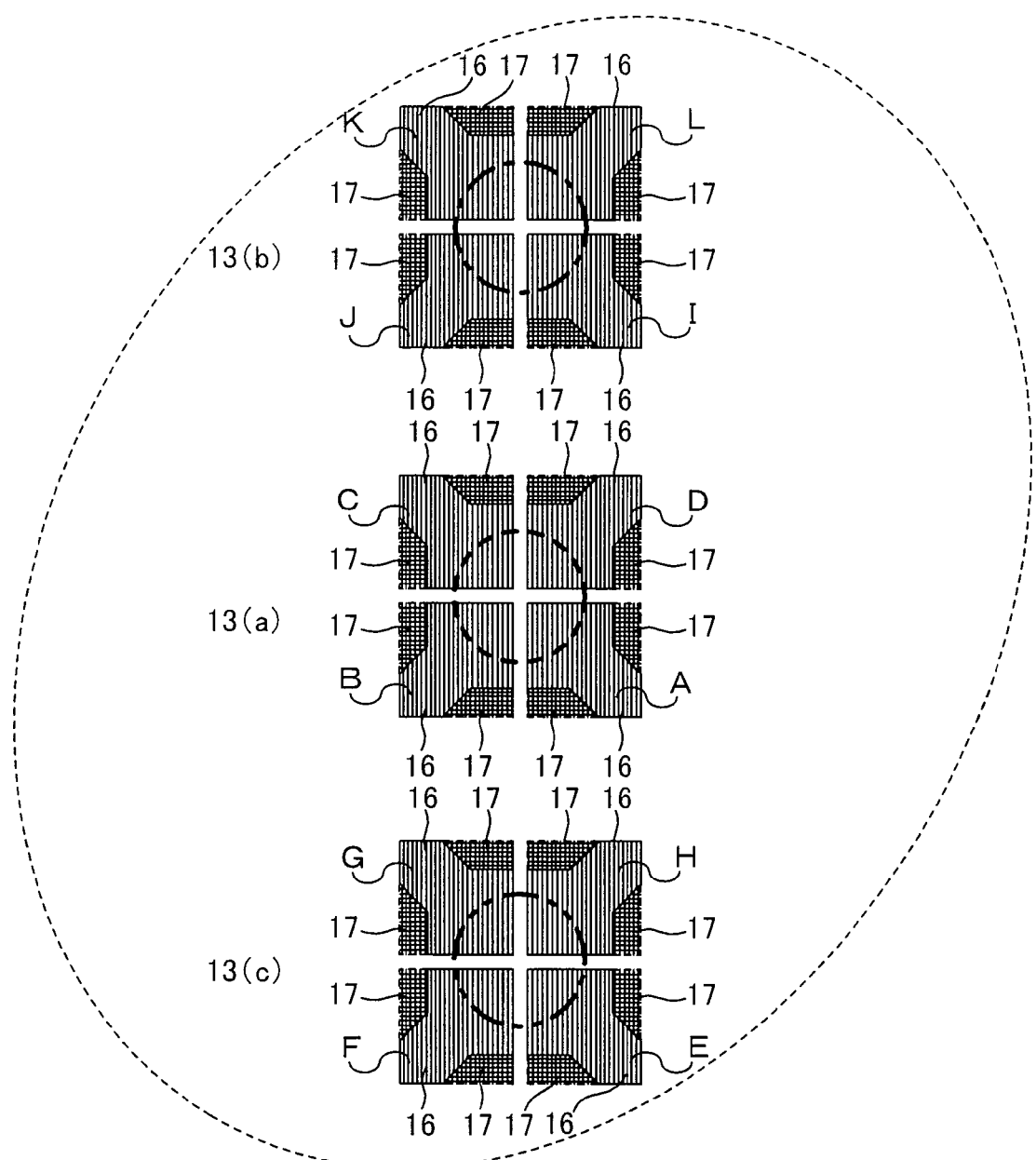
FIG. 4 depicts a light-receiving pattern of the 0th order reflected light from the other information surface when the focal point of the 0th order light is focused on one information surface.

The configuration of the light detecting apparatus 2 according to the present invention will be described with reference to FIGS. 1 to 4. FIG. 1 depicts four-split photodetectors 13(a) (first photodetector), 13(b) (second photodetector), and 13(c) (third photodetector) configuring the light detecting apparatus 2 according to the present invention. FIG. 3 depicts a light-receiving pattern of the 0th order reflected light from the other information surface 12 at the time of the focus jump from one information surface 12 to the other information surface 12. FIG. 4 depicts a light-receiving pattern of the 0th order reflected light from the other information surface 12 when the focal point of the 0th order light is focused on one information surface 12. Dash lines shown in FIGS. 1, 3, and 4 show the light-receiving patterns of the 0th order reflected light; dot-and-dash lines show the light-receiving patterns of the +1st order reflected light; and double-dot-and-dash lines show the light-receiving patterns of the −1st order reflected light. Dash lines of the light-receiving areas A to L of FIG. 1 show shapes before the light-receiving areas A to L are masked with an other-order light reception prohibited area (light reception prohibited area) 15 and a stray light reception prohibited area (light reception prohibited area) 17.

The light detecting apparatus 2 is configured by the four-split photodetectors 13(a), 13(b), and 13(c). The four-split photodetector 13(a) includes a square light-receiving area for receiving the 0th order reflected light from the cylindrical lens 10 and this light-receiving area is configured by four light-receiving areas A to D. The four-split photodetector 13(b) includes a square light-receiving area for receiving the +1st order reflected light from the cylindrical lens 10 and this light-receiving area is configured by four light-receiving areas I to L. The four-split photodetector 13(c) includes a square light-receiving area for receiving the −1st order reflected light from the cylindrical lens 10 and this light-receiving area is configured by four light-receiving areas E to H. The four-split photodetector 13(a) is disposed at a position where the 0th order reflected light from the cylindrical lens 10 forms a minimum confusion circle (a circle-shaped dash line of FIG. 1) when the focal point of the 0th order light is focused on the information surfaces 12(a) and 12(b). The four-split photodetector 13(b) is disposed at a position where the +1st order reflected light from the cylindrical lens 10 forms a minimum confusion circle (a circle-shaped dot-and-dash line of FIG. 1) when the focal point of the 0th order light is focused on the information surfaces 12(a) and 12(b). The four-split photodetector 13(c) is disposed at a position where the −1st order reflected light from the cylindrical lens 10 forms a minimum confusion circle (a circle-shaped double-dot-and-dash line of FIG. 1) when the focal point of the 0th order light is focused on the information surfaces 12(a) and 12(b). That is, the four-split photodetectors 13(a), 13(b), and 13(c) are adjacently disposed at the positions uniquely defined by the light path lengths of the 0th order reflected light and the ±1st order reflected light from the optical disc medium 11, the intervals of spots of the 0th order light and ±1st order light on the information surfaces 12(a) and 12(b), etc., such that the 0th order reflected light and the ±1st order reflected light form the minimum confusion circles.

The light-receiving areas A to D of the four-split photodetector 13(a) are divided such that an angle of about 45 degrees is generated relative to the directions of the elliptical shapes formed by the light-receiving pattern of the 0th order reflected light since the focal point of the 0th order light is away from the information surfaces 12(a) and 12(b) in the thickness direction of the optical disc medium 11. That is, when the focal point of the 0th order light is defocused from the information surfaces 12(a) and 12(b), the light-receiving pattern of the 0th order reflected light forms the elliptical shape which is changed with a diagonal line of the light-receiving areas A and C being a center of changing as well as being of a maximum length, or the elliptical shape which is changed with a diagonal line of the light-receiving areas B and D being a center of changing as well as being of a maximum length. In the following description, the light-receiving pattern of the 0th order reflected light in the embodiment is the elliptical shape extending obliquely downward to the left of FIG. 1 when the focal point of the 0th order light is shifted in the thickness direction of the optical disc medium 11 toward the objective lens 8 from the information surface 12 where the focal point should be focused on, and is the elliptical shape extending obliquely downward to the right of FIG. 1 when the focal point of the 0th order light is shifted toward the substrate 15 from the information surface 12.

The light-receiving areas A to D also include stray light receiving areas 16 (areas of vertical lines within the light-receiving areas A to D of FIG. 4) that receives the 0th order reflected light from the other information surface 12 when the focal point of the 0th order light is focused on one information surface 12 (a dot line surrounding the four-split photodetectors 13(a), 13(b), and 13(c) of FIG. 4, hereinafter, stray light). The light-receiving areas A to D also include the stray light reception prohibited areas 17 (areas of horizontal lines within the light-receiving areas A to D of FIG. 4) for prohibiting the reception of the stray light at portions of the stray light receiving areas 16. The stray light reception prohibited areas 17 are disposed on the stray light receiving areas 16 except areas where the light-receiving patterns of the 0th order reflected light from one information surface 12 are changed to a circular shape or elliptical shape.

As a result, the light-receiving areas A to D of the four-split photodetector 13(a) form a shape shown by 13(a) of FIG. 1 due to the stray light reception prohibited areas 17. The stray light reception prohibited areas 17 can be implemented by applying masks, such as aluminum generally used for forming the light-receiving areas A to D in the four-split photodetector 13(a), to the stray light reception prohibited areas 17 in the light-receiving areas A to D. Alternatively, the stray light reception prohibited areas 17 can be implemented by cutting out the areas in advance in the light-receiving areas A to D. Specifically, the masked or cutout light-receiving area A is an area having a shape formed from the original light-receiving area including the dash-line areas by removing an area of X1 to X3 via X2 located obliquely upward to the left in the X direction and an area of Y1 to Y3 via Y2 located obliquely upward to the left in the Y direction. The light-receiving area B is an area having a shape formed by rotating the light-receiving area A in the clockwise direction by 90 degrees; the light-receiving area C is an area having a shape formed by rotating the light-receiving area A in the clockwise direction by 180 degrees; and the light-receiving area D is an area having a shape formed by rotating the light-receiving area A in the anticlockwise direction by 90 degrees.

The light-receiving areas I to L of the four-split photodetector 13(b) are divided such that an angle of about 45 degrees is generated relative to the directions of the elliptical shapes formed by the light-receiving pattern of the +1st order reflected light since the focal point of the 0th order light is away from the information surfaces 12(a) and 12(b) in the thickness direction of the optical disc medium 11. That is, when the focal point of the 0th order light is defocused from the information surfaces 12(a) and 12(b), the light-receiving pattern of the +1st order reflected light forms the elliptical shape which is changed with a diagonal line of the light-receiving areas I and K being a center of changing as well as being of a maximum length, or the elliptical shape which is changed with a diagonal line of the light-receiving areas J and L being a center of changing as well as being of a maximum length. In the following description, the light-receiving pattern of the +1st order reflected light in the embodiment is the elliptical shape extending obliquely downward to the left of FIG. 1 when the focal point of the 0th order light is shifted in the thickness direction of the optical disc medium 11 toward the objective lens 8 from the information surface 12 where the focal point should be focused on, and is the elliptical shape extending obliquely downward to the right of FIG. 1 when the focal point of the 0th order light is shifted toward the substrate 15 from the information surface 12.

The light-receiving areas I and J also include other-order light receiving areas 14 (areas of vertical lines within the light-receiving areas I and J of FIG. 3) that receives the 0th order reflected light from the other information surface 12 at the time of the focus jump from one information surface 12 to the other information surface 12. The light-receiving areas I and J also include the other-order light reception prohibited areas 15 (areas of horizontal lines within the light-receiving areas I and J of FIG. 3) for prohibiting the reception of the 0th order reflected light from the other information surface 12 at portions of the other-order light receiving areas 14. The other-order light reception prohibited areas 15 are disposed on the other-order light receiving areas 14 except areas where the light-receiving patterns of the +1st order reflected light are changed to a circular shape or elliptical shape. Although the other-order light reception prohibited areas 15 are disposed as shown in FIG. 3 in the embodiment since the light receiving patterns of the 0th order reflected light from the other information surface 12 are overlapped with areas where the +1st order reflected light is changed to a circular shape or elliptical shape in the light-receiving areas I and J, this is not a limitation. For example, when the light receiving patterns of the 0th order reflected light from the other information surface 12 are overlapped with areas where the +1st order reflected light is changed to a circular shape or elliptical shape in the light-receiving areas K and L, the other-order light reception prohibited areas 15 are disposed on areas except the areas where the +1st order reflected light is changed to a circular shape or elliptical shape.

The other-order light reception prohibited areas 15 can be implemented by applying masks, such as aluminum generally used for forming the light-receiving areas I to L in the four-split photodetector 13(b), to the other-order light reception prohibited areas 15 in the light-receiving areas I and J. Alternatively, the other-order light reception prohibited areas 15 can be implemented by cutting out the areas in advance in the light-receiving areas I and J.

The light-receiving areas I to L also include the stray light receiving areas 16 (areas of vertical lines within the light-receiving areas I to L of FIG. 4) that receive the stray light from the other information surface 12 when the focal point of the 0th order light is focused on one information surface 12. The light-receiving areas I to L also include the stray light reception prohibited areas 17 (areas of horizontal lines within the light-receiving areas I to L of FIG. 4) for prohibiting the reception of the stray light at portions of the stray light receiving areas 16. The stray light reception prohibited areas 17 are disposed on the stray light receiving areas 16 except areas where the light-receiving patterns of the +1st order reflected light from one information surface 12 are changed to a circular shape or elliptical shape.

As a result, the light-receiving areas I to L of the four-split photodetector 13(b) form a shape shown by 13(b) of FIG. 1 due to the other-order light reception prohibited areas 15 and the stray light reception prohibited areas 17. The stray light reception prohibited areas 17 can be implemented by applying masks such as aluminum to the stray light reception prohibited areas 17 in the light-receiving areas I to L as is the case with the other-order light reception prohibited areas 15. Alternatively, the stray light reception prohibited areas 17 can be implemented by cutting out the areas in advance in the light-receiving areas I to L. Specifically, the masked or cutout light-receiving area I is an area having a shape formed from the original light-receiving area including the dash-line areas by removing an area of X4 to X6 via X5 located obliquely upward to the left in the X direction and an area of Y4 to Y6 via Y5 located obliquely upward to the left in the Y direction. The light-receiving area J is an area having a shape formed by rotating the light-receiving area I in the clockwise direction by 90 degrees; the light-receiving area K is an area having a shape formed by rotating the light-receiving area I in the clockwise direction by 180 degrees; and the light-receiving area L is an area having a shape formed by rotating the light-receiving area L in the anticlockwise direction by 90 degrees.

The light-receiving areas E to H of the four-split photodetector 13(c) are divided such that an angle of about 45 degrees is generated relative to the directions of the elliptical shapes formed by the light-receiving pattern of the −1st order reflected light since the focal point of the 0th order light is away from the information surfaces 12(a) and 12(b) in the thickness direction of the optical disc medium 11. That is, when the focal point of the 0th order light is defocused from the information surfaces 12(a) and 12(b), the light-receiving pattern of the −1st order reflected light forms the elliptical shape is changed with a diagonal line of the light-receiving areas E and G being a center of changing as well as being of a maximum length, or the elliptical shape is changed with a diagonal line of the light-receiving areas F and H being a center of changing as well as being of a maximum length. In the following description, the light-receiving pattern of the −1st order reflected light in the embodiment is the elliptical shape extending obliquely downward to the left of FIG. 1 when the focal point of the 0th order light is shifted in the thickness direction of the optical disc medium 11 toward the objective lens 8 from the information surface 12 where the focal point should be focused on, and is the elliptical shape extending obliquely downward to the right of FIG. 1 when the focal point of the 0th order light is shifted toward the substrate 15 from the information surface 12.

The light-receiving areas G and H also include the other-order light receiving areas 14 (areas of vertical lines within the light-receiving areas G and H of FIG. 3) that receives the 0th order reflected light from the other information surface 12 at the time of the focus jump from one information surface 12 to the other information surface 12. The light-receiving areas G and H also include the other-order light reception prohibited areas 15 (areas of horizontal lines within the light-receiving areas G and H of FIG. 3) for prohibiting the reception of the 0th order reflected light from the other information surface 12 at portions of the other-order light receiving areas 14. The other-order light reception prohibited areas 15 are disposed on the other-order light receiving areas 14 except areas where the light-receiving patterns of the −1st order reflected light are changed to a circular shape or elliptical shape. Although the other-order light reception prohibited areas 15 are disposed as shown in FIG. 3 in the embodiment since the light receiving patterns of the 0th order reflected light from the other information surface 12 are overlapped with areas where the −1st order reflected light is changed to a circular shape or elliptical shape in the light-receiving areas G and H, this is not a limitation. For example, when the light receiving patterns of the 0th order reflected light from the other information surface 12 are overlapped with areas where the −1st order reflected light is changed to a circular shape or elliptical shape in the light-receiving areas E and F, the other-order light reception prohibited areas 15 are disposed on areas except the areas where the −1st order reflected light is changed to a circular shape or elliptical shape.

The other-order light reception prohibited areas 15 can be implemented by applying masks, such as aluminum generally used for forming the light-receiving areas E to H in the four-split photodetector 13(c), to the other-order light reception prohibited areas 15 in the light-receiving areas G and H. Alternatively, the other-order light reception prohibited areas 15 can be implemented by cutting out the areas in advance in the light-receiving areas G and H.

The light-receiving areas E to H also include the stray light receiving areas 16 (areas of vertical lines within the light-receiving areas E to H of FIG. 4) that receive the stray light from the other information surface 12 when the focal point of the 0th order light is focused on one information surface 12. The light-receiving areas E to H also include the stray light reception prohibited areas 17 (areas of horizontal lines within the light-receiving areas E to H of FIG. 4) for prohibiting the reception of the stray light at portions of the stray light receiving areas 16. The stray light reception prohibited areas 17 are disposed on the stray light receiving areas 16 except areas where the light-receiving patterns of the −1st order reflected light from one information surface 12 are changed to a circular shape or elliptical shape.

As a result, the light-receiving areas E to H of the four-split photodetector 13(c) form a shape shown by 13(c) of FIG. 1 due to the other-order light reception prohibited areas 15 and the stray light reception prohibited areas 17. The stray light reception prohibited areas 17 can be implemented by applying masks such as aluminum to the stray light reception prohibited areas 17 in the light-receiving areas E to H as is the case with the other-order light reception prohibited areas 15. Alternatively, the stray light reception prohibited areas 17 can be implemented by cutting out the areas in advance in the light-receiving areas E to H. Specifically, the masked or cut-out light-receiving area E is an area having a shape formed from the original light-receiving area including the dash-line areas by removing an area of X7 to X9 via X8 located obliquely upward to the left in the X direction and an area of Y7 to Y9 via Y8 located obliquely upward to the left in the Y direction. The light-receiving area F is an area having a shape formed by rotating the light-receiving area E in the clockwise direction by 90 degrees; the light-receiving area G is an area having a shape formed by rotating the light-receiving area E in the clockwise direction by 180 degrees; and the light-receiving area H is an area having a shape formed by rotating the light-receiving area E in the anticlockwise direction by 90 degrees.

==Effect of Light Detecting Apparatus 2 at Time of Focus Jump==

Figure 5A:
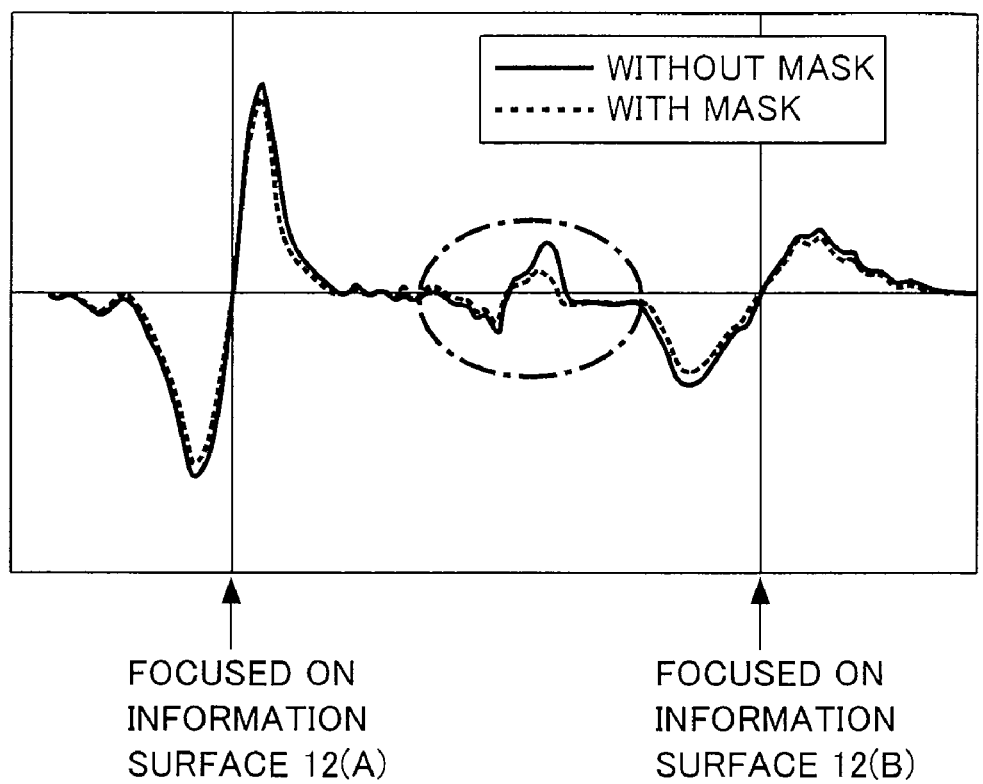
FIG. 5A depicts an FE signal generated based on outputs from light-receiving areas A to L of the light detecting apparatus according to the present invention.
Figure 5B:
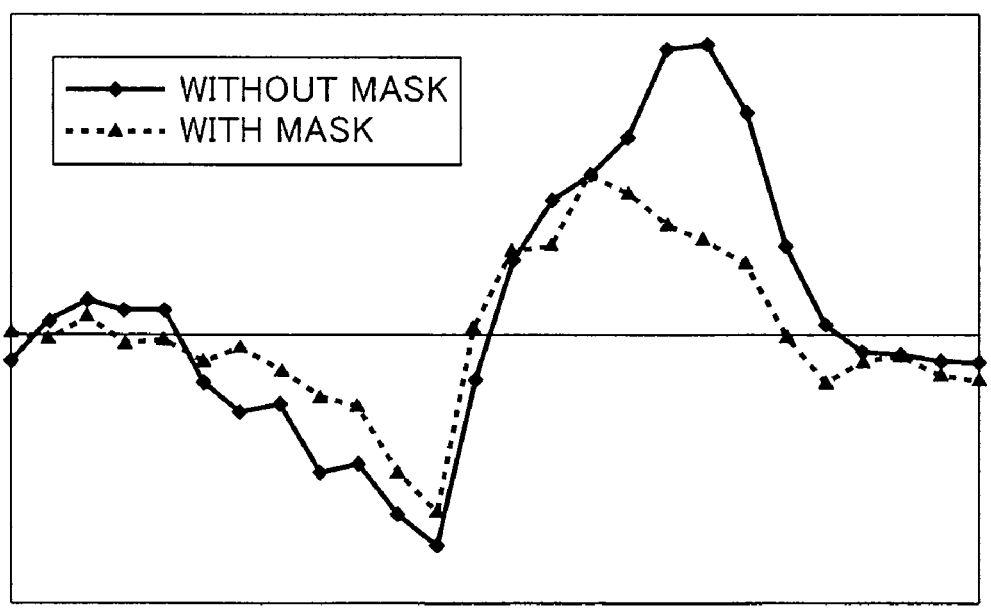
FIG. 5B is an enlarged view of a portion within a dot-and-dash line shown in FIG. 5A.

The effect of the light detecting apparatus 2 according to the present invention at the time of the focus jump will be described with reference to FIGS. 1, 3, 5A, and 5B. FIG. 5A depicts the FE signal generated based on the outputs from the light-receiving areas A to L of the light detecting apparatus 2 according to the present invention. FIG. 5B is an enlarged view of a portion within a dot-and-dash line shown in FIG. 5A.

The FE signal can be obtained by calculating {(output of light-receiving area A+output of light-receiving area C)−(output of light-receiving area B+output of light-receiving area D)}+k[{(output of light-receiving area I+output of light-receiving area K)−(output of light-receiving area J+output of light-receiving area L)}+{(output of light-receiving area E+output of light-receiving area G)−(output of light-receiving area F+output of light-receiving area H)}] (where k is the light intensity of the 0th order light/the light intensity of the ±1st order light) based on the outputs from the light-receiving areas A to H. A solid line shown in FIG. 5 indicates the FE signal before the above other-order light reception prohibited areas 15 are disposed on the light-receiving areas G to J.

As shown in FIG. 3, since the other-order light reception prohibited areas 15 are disposed in the light-receiving areas G to J, the 0th order reflected light is not received in the range of the other-order light reception prohibited areas 15 within the other-order light receiving areas 14. That is, at the time of the focus jump, the output of the light-receiving areas G to J becomes smaller in the above FE signal equation, and the FE signal becomes smaller. As a result, as shown by the dash lines of FIGS. 5A and 5B, at the time of the focus jump, the S-shape based on the reception of the 0th order reflected light is smoothed as compared to the solid lines. Therefore, the effect of the 0th order reflected light can be reduced at the time of the focus jump due to the 0th order reflected light.

==Effect of Light Detecting Apparatus 2 on Stray Light==

Figure 6A:
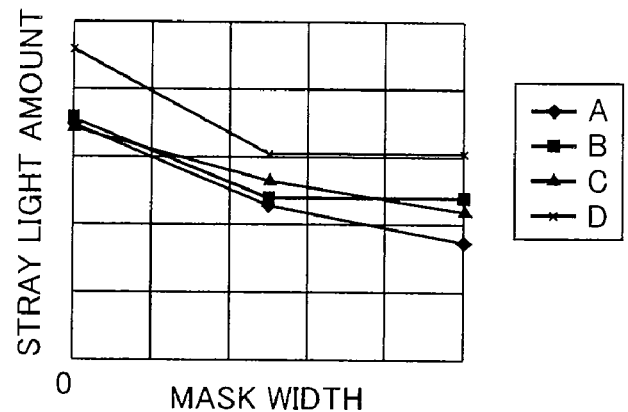
FIG. 6A depicts a change in a stray light amount received by the light-receiving areas A to D when a mask width is changed in the light-receiving areas A to D of the light detecting apparatus according to the present invention.
Figure 6B:
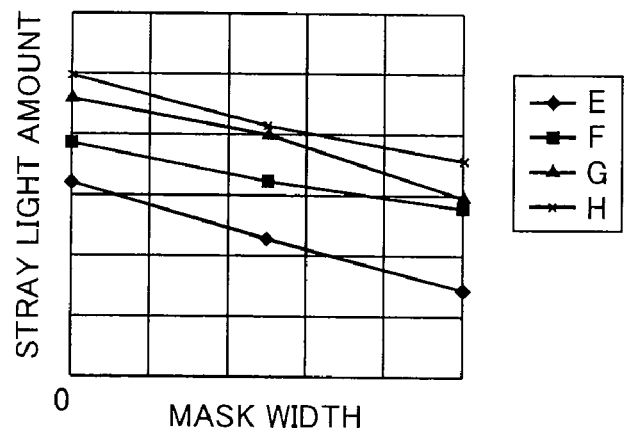
FIG. 6B depicts a change in a stray light amount received by the light-receiving areas E to H when a mask width is changed in the light-receiving areas E to H of the light detecting apparatus according to the present invention.
Figure 6C:
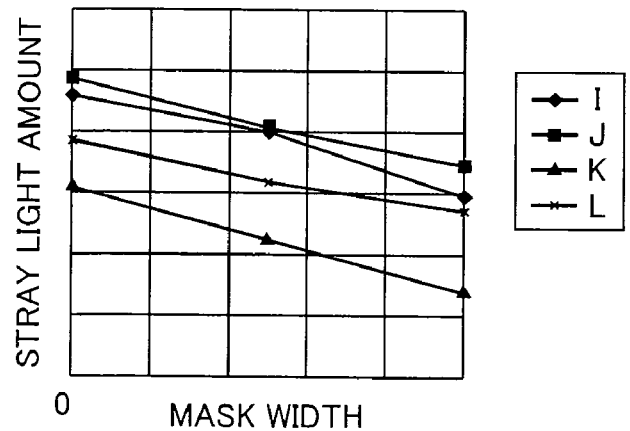
FIG. 6C depicts a change in a stray light amount received by the light-receiving areas I to L when a mask width is changed in the light-receiving areas I to L of the light detecting apparatus according to the present invention.
Figure 7:
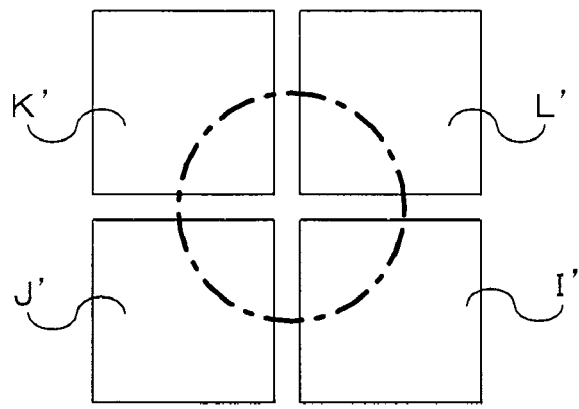
FIG. 7 depicts a light-receiving pattern of three four-split photodetectors when the focal point of the 0th order light is focused on the information surface.
Figure 7:
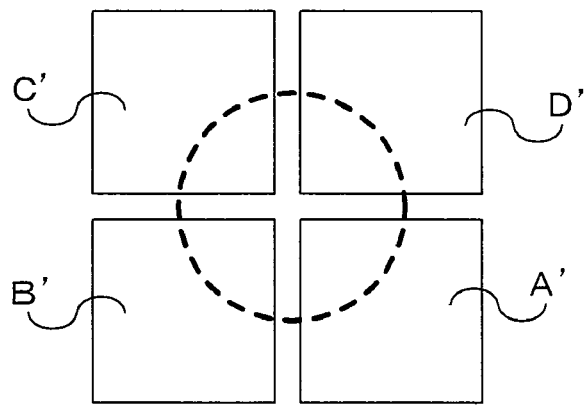
Figure 7:
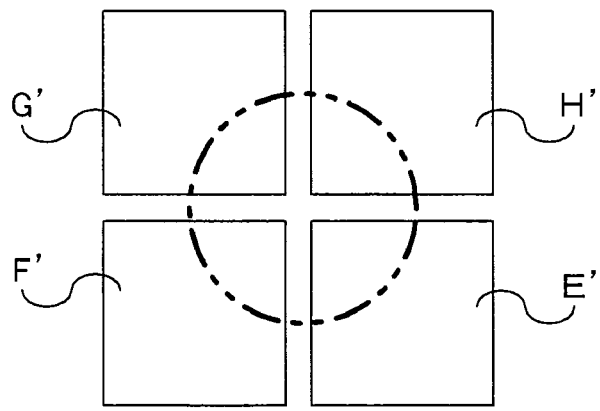
Figure 8:
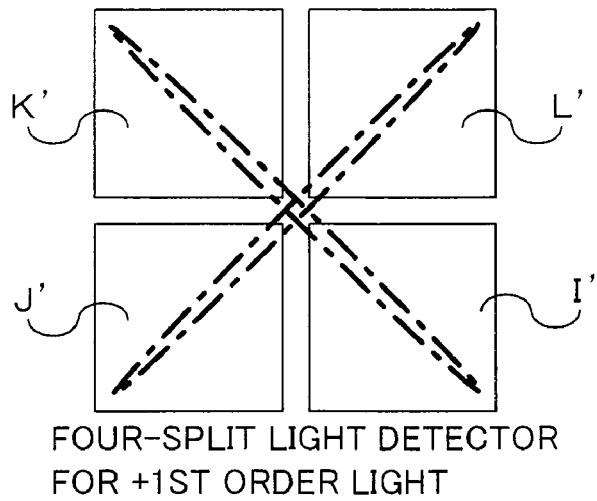
FIG. 8 depicts a light-receiving pattern of three four-split photodetectors when the focal point of the 0th order light is not focused on the information surface.
Figure 8:
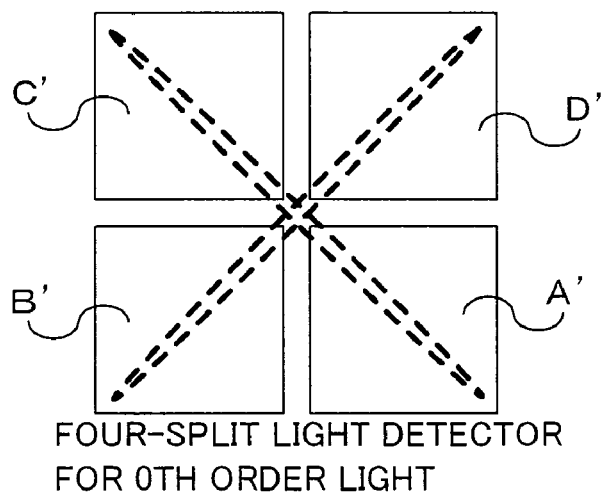
Figure 8:
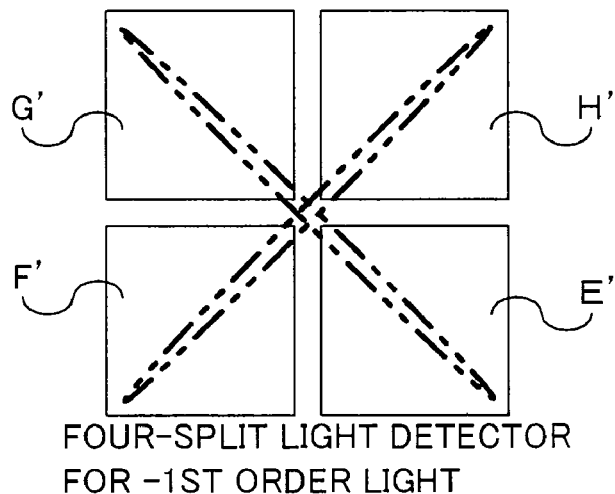
Figure 9:
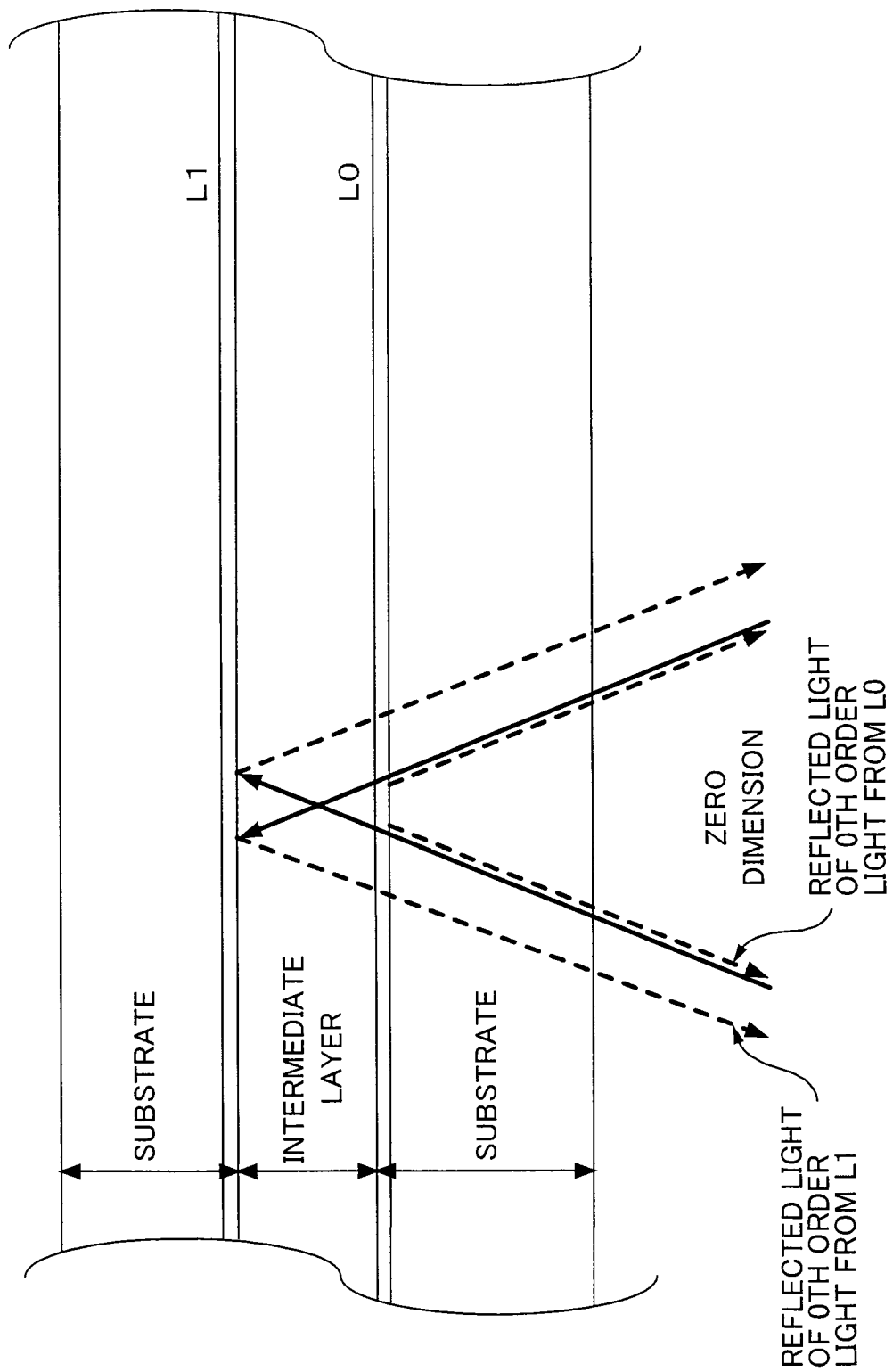
FIG. 9 depicts a configuration of a two-layer optical disc medium.
Figure 10:
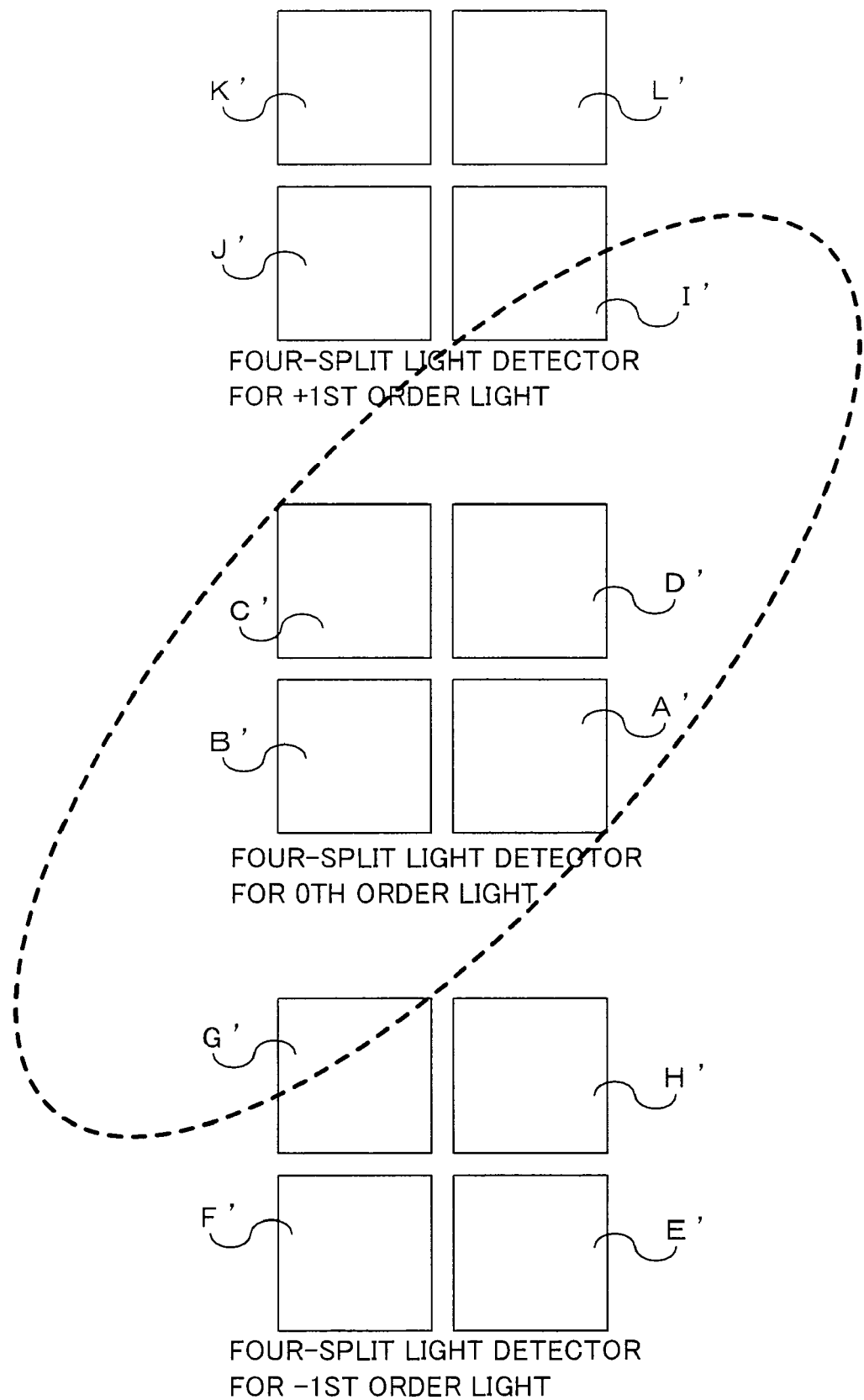
FIG. 10 depicts a light-receiving pattern of the 0th order reflected light from the other information surface at the time of focus jump from one information surface to the other information surface.
Figure 11:
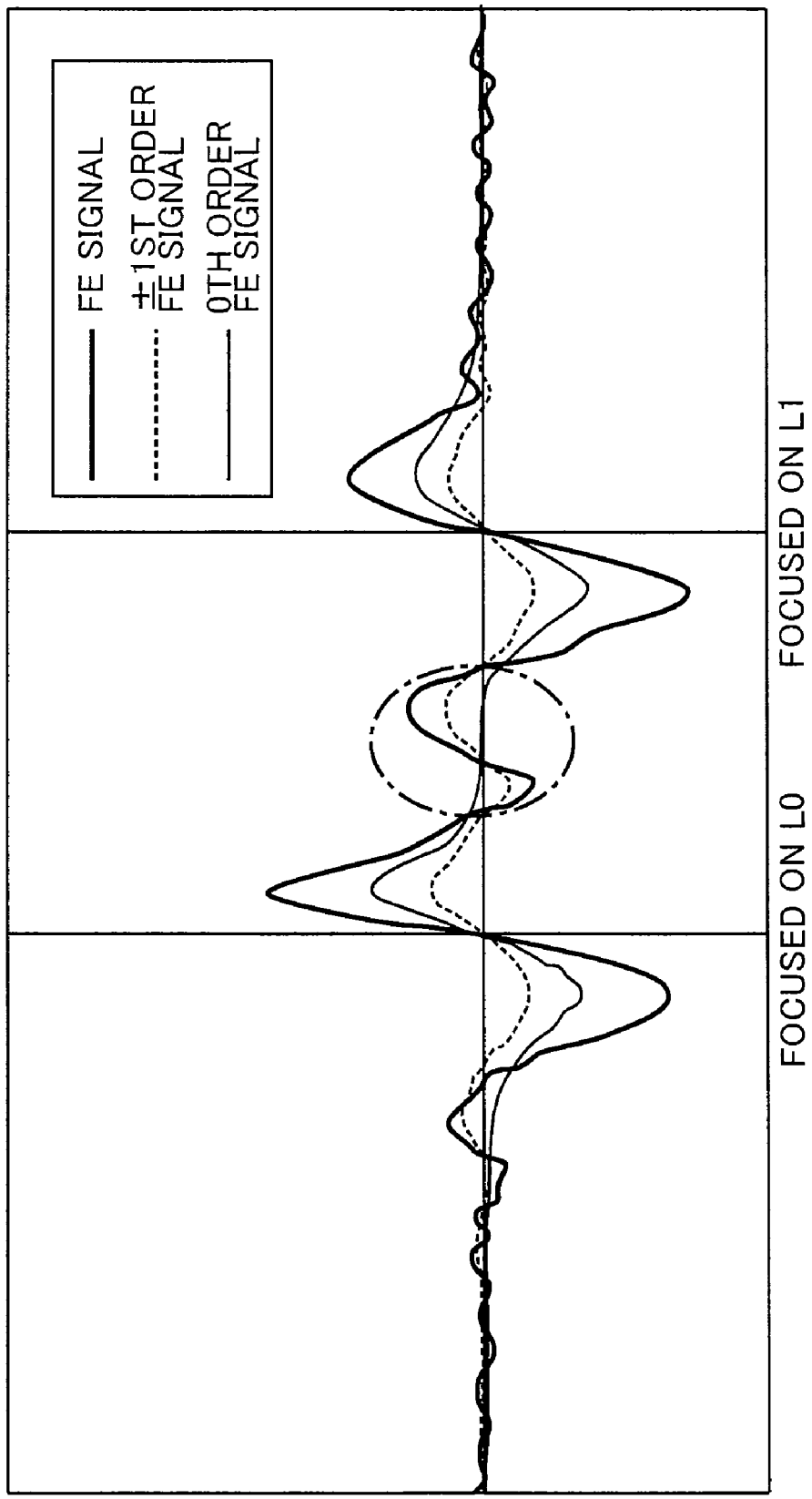
FIG. 11 depicts a focus error signal of the two-layer optical disc medium.
Figure 12:
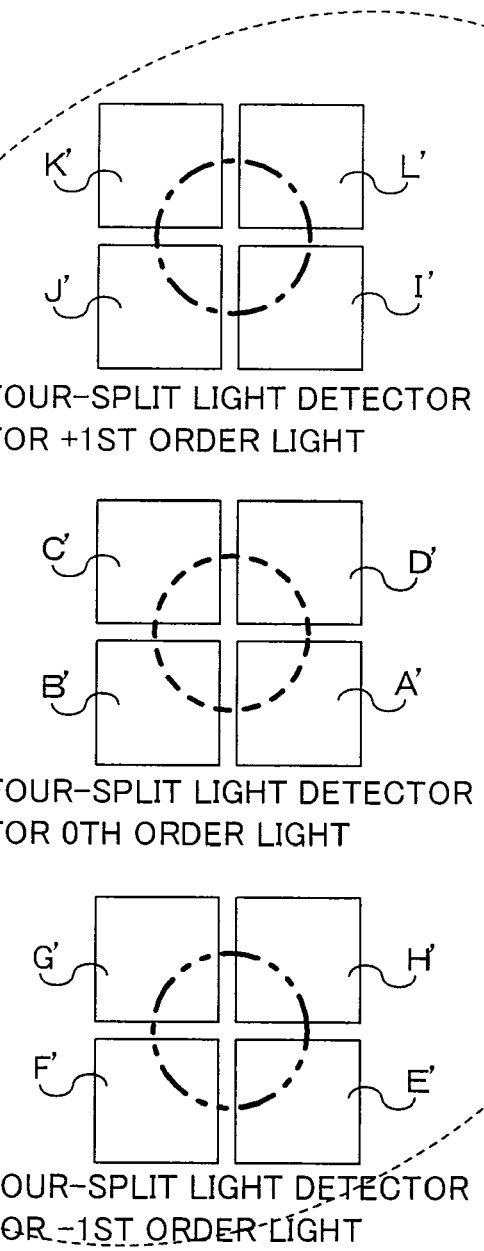
FIG. 12 depicts a light-receiving pattern of the reflected light of the 0th order light from the other information surface when the focal point of the 0th order light is focused on one information surface.

The effect of the light detecting apparatus 2 according to the present invention on the stray light will be described with reference to FIGS. 6A to 6C. FIG. 6A depicts a change in a stray light amount received by the light-receiving areas A to D when a mask width is changed in the light-receiving areas A to D. FIG. 6B depicts a change in a stray light amount received by the light-receiving areas E to H when a mask width is changed in the light-receiving areas E to H. FIG. 6C depicts a change in a stray light amount received by the light-receiving areas I to L when a mask width is changed in the light-receiving areas I to L.

As shown in FIG. 4, since the stray light reception prohibited areas 17 are disposed in the light-receiving areas A to L, the stray light is not received in the range of the stray light reception prohibited areas 17 within the stray light receiving areas 16. As a result, as shown in FIGS. 6A, 6B, and 6C, the stray light amount received in the light-receiving areas A to L is reduced. Therefore, the effect of the stray light from the other information surface can be reduced when the focal point of the 0th order light is focused on one information surface 12.

According to the above embodiment, when the focal point of the 0th order light is moved from one information surface 12 to the other information surface 12, the application of a portion of the 0th order reflected light can be prohibited when the 0th order reflected light from the other information surface 12 is applied to the light-receiving areas G, H, I, and J of the four-split photodetectors 13(b) and 13(c). As a result, the effect of the 0th order reflected light can be reduced in the focusing control using the differential astigmatic method when the focal point of the 0th order light is moved from one information surface 12 to the other information surface 12.

By masking the other-order light receiving areas 14, the other-order light reception prohibited areas 15 can easily be implemented in the light detecting apparatus 2.

By cutting out the other-order light receiving areas 14, the other-order light reception prohibited areas 15 can certainly be implemented in the light detecting apparatus 2.

By disposing the other-order light reception prohibited areas 15 on the portions of the areas except the areas where the application shapes of the ±1st order reflected light are changed on the diagonal lines of the light-receiving areas E to H and I to L of the four-split photodetectors 13(b) and 13(c), the other-order light reception prohibited areas 15 can be disposed without affecting the focusing control using the differential astigmatic method. That is, the focal point of the 0th order light can certainly be focused on one or the other information surface 12 with the focusing control using the differential astigmatic method, and the effect of the 0th order reflected light from the other information surface 12 can be reduced.

When the focal point of the 0th order light is focused on one information surface 12, the application of a portion of the stray light can be prohibited when the stray light from the other information surface 12 is applied to the light-receiving areas A to L of the four-split photodetectors 13(a), 13(b), and 13(c). As a result, the effect of the stray light due to the 0th order light reflected by the other information surface 12 can be reduced when the focal point of the 0th order light is focused on one information surface 12.

By masking the stray light receiving areas 16, the stray light reception prohibited areas 17 can easily be implemented in the light detecting apparatus 2.

By cutting out the stray light receiving areas 16, the stray light reception prohibited areas 17 can certainly be implemented in the light detecting apparatus 2.

By disposing the stray light reception prohibited areas 17 on the areas except the areas where the application shapes of the 0th order reflected light and the 1st order reflected light are changed in the light-receiving areas A to L of the four-split photodetectors 13(a), 13(b), and 13(c), the stray light reception prohibited areas 17 can be disposed without affecting the focusing control using the differential astigmatic method. That is, the 0th order light can certainly be condensed on one or the other information surface 12 with the focusing control using the differential astigmatic method, and the effect of the 0th order reflected light from the other information surface 12 can be reduced.

Although the light detecting apparatus according to the present invention is used for the optical disc medium 11 that is a two-layer optical disc medium in the embodiment, this is not a limitation. The light detecting apparatus according to the present invention can also be used for the reception of the 0th order reflected light at the time of the focus jump from one information surface to the other information surface in a multilayer optical disc medium including three or more layers. The light detecting apparatus according to the present invention can also be used for the reception of the stray light from the other information surface when the 0th order light is focused on one information surface.

Although the light detecting apparatus and the optical pickup apparatus according to the present invention have been described as above, the above description is merely for the purpose of facilitating the understanding of the present invention and is not intended to limit the present invention. The present invention may variously be changed/altered without departing from the spirit thereof and the present invention encompasses the equivalents thereof.

What is claimed is:

1. A light detecting apparatus using a differential astigmatic method to focus 0th order light on any information surfaces of a multilayer optical disc medium, the 0th order light being among 0th order light, positive higher-order diffracted light of 1st or higher order, and negative higher-order diffracted light of 1st or higher order, all of which are generated by diffracting a laser beam, the apparatus comprising:

a first photodetector that includes a light-receiving area for receiving the reflected light of the 0th order light from an information surface where the 0th order light should be focused on;

a second photodetector that is adjacent to the first photodetector leaving a predetermined space therebetween, the second photodetector including a light-receiving area for receiving the reflected light of the positive higher-order diffracted light from the information surface where the 0th order light should be focused on; and a third photodetector that is adjacent to the first photodetector leaving a predetermined space therebetween, the third photodetector including a light-receiving area for receiving the reflected light of the negative higher-order diffracted light from the information surface where the 0th order light should be focused on, wherein the light-receiving areas of the second and the third photodetectors include other-order light receiving areas that receive the reflected light of the 0th order light from an information surface where the 0th order light should not be focused on, when the focal point of the 0th order light is moved from one information surface to the other information surface, and wherein portions of the other-order light receiving areas of the second and the third photodetectors include light reception prohibited areas that prohibit the reception of the reflected light of the 0th order light from the information surface where the 0th order light should not be focused on.

2. The light detecting apparatus of claim 1, wherein the light reception prohibited area is formed by masking a portion of the other-order light receiving area.

3. The light detecting apparatus of claim 2, wherein the shape of the light-receiving areas of the second and the third photodetectors is square, and wherein the light reception prohibited areas are disposed on areas except areas where the reflected light of the positive and negative higher-order diffracted light from the information surface for focusing the 0th order light is changed with each of diagonal lines of the light-receiving areas of the second and the third photodetectors being a center of changing as well as being of a maximum length.

4. The light detecting apparatus of claim 1, wherein the light reception prohibited area is formed by cutting out a portion of the other-order light receiving area.

5. The light detecting apparatus of claim 3, wherein the shape of the light-receiving areas of the second and third photodetectors is square, and wherein the light reception prohibited areas are disposed on areas except areas where the reflected light of the positive and negative higher-order diffracted light from the information surface for focusing the 0th order light is changed with each of diagonal lines of the light-receiving areas of the second and the third photodetectors being a center of changing as well as being of a maximum length.

6. The light detecting apparatus of claim 1, wherein the shape of the light-receiving areas of the second and the third photodetectors is square, and wherein the light reception prohibited areas are disposed on areas except areas where the reflected light of the positive and negative higher-order diffracted light from the information surface for focusing the 0th order light is changed with each of diagonal lines of the light-receiving areas of the second and the third photodetectors being a center of changing as well as being of a maximum length.

7. An optical pickup apparatus comprising the light detecting apparatus of claim 1.

8. A light detecting apparatus using a differential astigmatic method to focus 0th order light on any information surfaces of a multilayer optical disc medium, the 0th order light being among 0th order light, positive higher-order diffracted light of 1st or higher order, and negative higher-order diffracted light of 1st or higher order, all of which are generated by diffracting a laser beam, the apparatus comprising:

a first photodetector that includes a light-receiving area for receiving the reflected light of the 0th order light from an information surface where the 0th order light should be focused on;

a second photodetector that is adjacent to the first photodetector leaving a predetermined space therebetween, the second photodetector including a light-receiving area for receiving the reflected light of the positive higher-order diffracted light from the information surface where the 0th order light should be focused on; and a third photodetector that is adjacent to the first photodetector leaving a predetermined space therebetween, the third photodetector including a light-receiving area for receiving the reflected light of the negative higher-order diffracted light from the information surface where the 0th order light should be focused on, wherein the light-receiving areas of the first, the second, and the third photodetectors include stray light receiving areas that receive stray light, which is the reflected light of the 0th order light from the other information surface where the 0th order light should not be focused on, when the 0th order light is focused on one information surface, and wherein portions of the stray light receiving areas of the first, the second, and the third photodetectors include light reception prohibited areas that prohibit the reception of the stray light.

9. The light detecting apparatus of claim 8, wherein
the light reception prohibited area is formed by masking a portion of the stray light receiving area.

10. The light detecting apparatus of claim 9, wherein
the shape of the light-receiving areas of the first, the second, and the third photodetectors is square, and wherein
the light reception prohibited areas are disposed on areas except areas where the reflected light of the 0th order light and the positive and the negative higher-order diffracted light from the information surface for focusing the 0th order light is changed with each of diagonal lines of the light-receiving areas of the first, the second, and the third photodetectors being a center of changing as well as being of a maximum length.

11. The light detecting apparatus of claim 8, wherein
the light reception prohibited area is formed by cutting out a portion of the stray light receiving area.

12. The light detecting apparatus of claim 11, wherein
the shape of the light-receiving areas of the first, the second, and the third photodetectors is square, and wherein
the light reception prohibited areas are disposed on areas except areas where the reflected light of the 0th order light and the positive and the negative higher-order diffracted light from the information surface for focusing the 0th order light is changed with each of diagonal lines of the light-receiving areas of the first, the second, and the third photodetectors being a center of changing as well as being of a maximum length.

13. The light detecting apparatus of claim 8, wherein
the shape of the light-receiving areas of the first, the second, and the third photodetectors is square, and wherein
the light reception prohibited areas are disposed on areas except areas where the reflected light of the 0th order light and the positive and the negative higher-order diffracted light from the information surface for focusing the 0th order light is changed with each of diagonal lines of the light-receiving areas of the first, the second, and the third photodetectors being a center of changing as well as being of a maximum length.

\* \* \* \* \*

UNITED STATES PATENT AND TRADEMARK OFFICE
CERTIFICATE OF CORRECTION

PATENT NO.      : 7,639,591 B2
APPLICATION NO. : 11/617624
DATED           : December 29, 2009
INVENTOR(S)     : Shindo It is certified that error appears in the above-identified patent and that said Letters Patent is hereby corrected as shown below:

Column 1, line 46: replace "$\pm$ 1st order patterns" with --+1st order light; and double-dot-and-dash lines show the light-receiving patterns--.

Column 3, line 14: replace "list" with --$\pm$ 1st--.

Column 6, line 17: replace "list" with --$\pm$ 1st--.

Column 6, line 48: replace "list" with --$\pm$ 1st--.

Column 6, line 49: replace "list" with --$\pm$ 1st--.

Column 13, line 29: replace "list" with --$\pm$ 1st--.

Signed and Sealed this

Sixteenth Day of February, 2010

David J. Kappos
*Director of the United States Patent and Trademark Office*